United States Patent Office 3,141,038
Patented July 14, 1964

3,141,038
N-HALO-N-METHYL-N'-PHENYL UREAS
Harvey M. Loux, Claymont, Del., assignor to E. I. du Pont de Nemours and Company, Wilmington, Del., a corporation of Delaware
No Drawing. Filed Nov. 13, 1961, Ser. No. 152,043
3 Claims. (Cl. 260—553)

This invention relates to ureas. More specifically it refers to novel N-haloureas and to herbicidal compositions and methods employing them.

The novel compounds of this invention are represented by the formula:

(1) 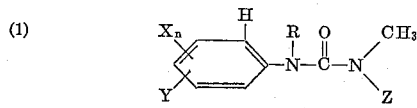

wherein

X equals hydrogen or halogen;
Y equals hydrogen, alkyl of 1 through 3 carbon atoms or halogen;
n equals 1 or 2;
R equals hydrogen, methyl or methoxy; and
Z equals fluorine, chlorine or bromine.

Some of the preferred compounds are the 1-aryl-3-methyl-3-chloroureas represented by the formula:

(2) 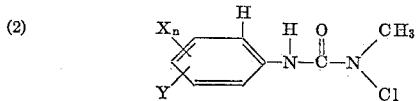

wherein

X equals hydrogen or chlorine;
Y equals hydrogen or chlorine; and
n equals 1 or 2.

A particularly preferred compound because of outstanding herbicidal activity is 1-(3,4-dichlorophenyl)-3-methyl-3-chlorourea.

PREPARATION

These compounds can be prepared by the direct halogenation of the appropriate corresponding methylurea. Thus, chlorination, bromination or fluorination can be carried out as illustrated by the following equation to produce white, crystalline compounds:

(3) 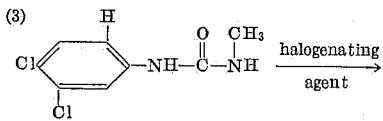

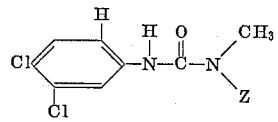

wherein Z has the same meaning as above.

It is important to use only the theoretical amount of halogenating agent since an excessive amount will result in the formation of the poly N-halo ureas and in ring halogenation.

Illustrative of ureas prepared in the above-described manner are the following:

3-(3,4-dichlorophenyl)-1-methyl-1-fluorourea
3-(3,4-dichlorophenyl)-1-methyl-1-chlorourea
3-(2,3,4-trichlorophenyl)-1-methyl-1-chlorourea
3-(3-methyl-4-chlorophenyl)-1-methyl-1-chlorourea
3-(p-tolyl)-1-methyl-1-chlorourea
3-(3-chloro-4-isopropyl)-1-methyl-1-bromourea
3-(3-chloro-4-isopropyl)-1-methyl-1-chlorourea
3-(3,4-dichlorophenyl)-1,3-dimethyl-1-chlorourea
3-(3-chloro-4-isopropylphenyl)-1,3-dimethyl-1-fluorourea
3-(3-chloro-4-isopropylphenyl)-1,3-dimethyl-1-bromourea and
3-(3,4-dichlorophenyl)-3-methoxy-1-methyl-1-chlorourea Those compounds of this invention where R is hydrogen can be prepared by the treatment of the appropriately substituted phenyl isocyanate with the methyl haloamine according to the following equation.

(4) 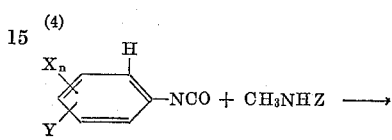

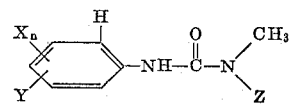

wherein X, Y, Z and n have the same meaning as above.

The above reaction described in Equation 4 can be carried out in any suitable inert organic solvent, e.g., ether, dioxane or the like, at convenient temperatures, preferably in the range of 25 to 40° C. The order of addition of the reactants does not appear to be significant.

Illustrative of compounds prepared by this latter route are the following:

3-(p-chlorophenyl)-1-methyl-1-chlorourea
3-(p-chlorophenyl)-1-methyl-1-bromourea
3-(3,4-dichlorophenyl)-methyl-1-chlorourea
3-(3,4-dichlorophenyl)-1-methyl-1-bromourea
3-(2,4-dichlorophenyl)-1-methyl-1-chlorourea
3-(2,4-dichlorophenyl)-1-methyl-1-bromourea
3-(p-bromophenyl)-1-methyl-1-chlorourea
3-(p-bromophenyl)-1-methyl-1-bromourea
3-(p-tolyl)-1-methyl-1-bromourea
3-(3-chloro-4-methylphenyl)-1-methyl-1-chlorourea
3-(3-chloro-4-methylphenyl)-1-methyl-1-bromourea
3-(3-chloro-4-isopropylphenyl)-1-methyl-1-chlorourea and
3-(3-chloro-4-isopropylphenyl)-1-methyl-1-bromourea.

Compounds of this invention where R is methyl can be prepared by the treatment of the appropriately substituted carbamoyl chloride with the methyl haloamine according to the following equation.

(5) 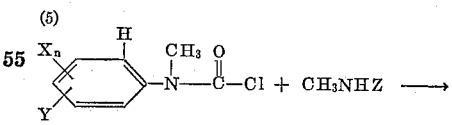

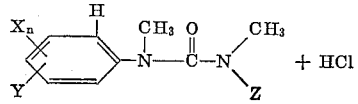

wherein X, Y, Z and n have the same meaning as above.

The reaction described in Equation 5 can be carried out in any suitable organic solvent, e.g., ether, dioxane or the like, at convenient temperatures, preferably in the range of 25 to 40° C. A sufficient quantity of a base, such as pyridine or trimethyl amine, should also be present to react with the evolved hydrogen chloride. The order of the addition of the reactants does not appear to be significant.

Illustrative of compounds prepared in Equation 5 are the following:

3-(p-chlorophenyl)-1,3-dimethyl-1-chlorourea
3-(p-chlorophenyl)-1,3-dimethyl-1-bromourea
3-(3,4-dichlorophenyl)-1,3-dimethyl-1-chlorourea
3-(3,4-dichlorophenyl)-1,3-dimethyl-1-bromourea
3-(2,4-dichlorophenyl)-1,3-dimethyl-1-chlorourea
3-(2,4-dichlorophenyl)-1,3-dimethyl-1-bromourea
3-(p-bromophenyl)-1,3-dimethyl-1-chlorourea
3-(p-bromophenyl)-1,3-dimethyl-1-bromourea
3-(p-tolyl)-1,3-dimethyl-1-chlorourea
3-(p-tolyl)-1,3-dimethyl-1-bromourea
3-(3-chloro-4-methylphenyl)-1,3-dimethyl-1-chlorourea
3-(3-chloro-4-isopropylphenyl)-1,3-dimethyl-1-bromourea
3-(3-chloro-4-isopropylphenyl)-1,3-dimethyl-1-chlorourea and
3-(3-chloro-4-methylphenyl)-1,3-dimethyl-1-bromourea.

USE

The compounds of this invention possess outstanding herbicidal activity and can be readily mixed into herbicidal compositions. These herbicidal compositons can be in the form of wettable powders, granules, pellets or emulsifiable oils. They are effective both as foliage and as soil treatments.

The compounds of this invention are characterized not only by their herbicidal activity, but furthermore, by their solubility in water immiscible oil solvents such as isophorone, thereby making it possible to formulate them easily as liquid concentrates. In addition, these compounds tend to break down or lose their herbicidal activity more quickly in acid soils than in alkaline soils. Therefore, treatment of acid soils with compounds of this invention results in excellent control of weeds followed by rapid disappearance of the herbicide from the soil. Thus, the treated soil can be used to grow desirable plants soon after the weeds have been destroyed.

COMPOSITIONS

In herbicidal compositions of this invention the N-halourea is mixed separately with one or more surface-active agents.

The surface-active agent used in this invention can be a dispersant, wetting agent or an emulsifying agent which will assist dispersion of the composition. The surface-active agent or surfactant can include such anionic, cationic and non-ionic agents as have heretofore been employed in compositons of similar type. Suitable surface-active agents are set out, for example, in Searle U.S. Patent 2,426,417 issued August 26, 1947; Todd U.S. Patent 2,655,447 issued October 31, 1953; Jones U.S. Patent 2,412,510 issued December 10, 1946; or Lenher U.S. Patent 2,139,276 issued December 6, 1938. A detailed list of such agents is set forth in "Detergents and Emulsifiers— Up to Date" (1960) by John W. McCutcheon, Inc., and Bulletin E–607 of the Bureau of Entomology and Plant Quarantine of the U.S. Department of Agriculture.

Suitable surface-active agents for use in compositions of the present invention are: polyethylene glycol fatty esters and fatty alkylol amide condensates, alkyl aryl sulfonates, fatty alcohol sulfates, dialkyl esters of sodium sulfosuccinate, fatty acid esters of sodium isethionate, polyoxyethylene thioether, and long chain quaternary ammonium chloride.

Among the more preferred surfactants are the anionic and non-ionic type. Among anionic surface-active agents, preferred ones are alkali metal or amine salts of alkyl benzene sulfonic acids such as dodecylbenzene sulfonic acid, sodium lauryl sulfate, alkyl naphthalene sulfonates, sodium N-methyl-N-oleoyltaurate, oleic acid ester of sodium isethionate, dioctyl sodium sulfosuccinate, sodium dodecyldiphenoloxide disulfonate. Among non-ionic compounds, preferred members are alkyl phenoxy poly(ethyleneoxy) ethanols such as nonyl phenol adducts with ethylene oxide; trimethyl nonyl polyethylene glycol ethers, polyethylene oxide adducts of fatty and rosin acids, long chain alkyl mercaptan adducts with ethylene oxide.

In general, less than 10% by weight of the wetting agent will be used in compositions of this invention and ordinarily the amount of wetting agent will be less than 1% by weight.

Additional surface-active agents can be added to the above formulation to increase the ratio of surface-active agent:active agent up to as high as 5:1 by weight.

The herbicidal compositions of this invention can additionally contain finely divided inert diluents such as talcs, natural clays including attapulgite clay, pyrophyllite, diatomaceous earth, synthetic fine silicas, calcium silicate, carbonates, calcium phosphates, sulfur, lime, and such flours as walnut shell, wheat, redwood, soya beans and cottonseed.

The amount of the finely divided inert solid diluent can vary widely and can range from 10 to 98% by weight of the herbicidal composition. The particle size can vary considerably but will ordinarily be somewhat under 50 microns in the finished formulation.

Among the preferred compositions of this invention are emulsifiable oil solutions. In these, the N-halourea, the surface-active agent and an oil form a liquid which can conveniently be poured and measured. Such solutions can be mixed with water at the point of application to form an emulsion containing the herbicide and the surface-active agent. Such compositions have the advantage that the oil will often act as a foam inhibitor and thus reduce the tendency for large amounts of surfactants to form objectionable foam. It also is possible to include in such formulations oils which have herbicidal action of their own.

The oil, such as isophorone, should preferably be water-immiscible and be of a type in which the active agent will be soluble in the amounts used in particular formulations.

Emulsifiable liquid compositions can be made with an aliphatic or aromatic hydrocarbon oil having a boiling point of 100 to 400° C. Typical of the hydrocarbon oils that can be used are commercial herbicidal oils such as "Lion Herbicidal Oil No. 6," diesel oils, kerosene, paraffin oils and fuel oils.

In the herbicidal compositions containing oils the N-halourea will be present in amounts ranging from 1% to 35% by weight. Precise concentration of active agent, of course, will depend on the intended use for the composition.

METHODS

The method of applying the compositions of this invention comprises applying an N-halourea, ordinarily in a herbicidal composition of one of the aforementioned types, to a locus or area to be protected from undesirable plant growth. The active compound, of course, is applied in amounts sufficient to exert the desired herbicidal action.

The amount of the N-halourea to be used in clearing land of weeds will naturally depend on the condition of the vegetation, the herbicidal activity desired, the formulation used, the mode of application, the climate, the season of the year and other variables. Recommendations as to precise amounts, therefore, are not possible. In general, however, direct foliage application as a liquid spray or dust to the locus to be protected using from 1 to 35 pounds per acre of the N-halourea will be satisfactory.

In order that the invention may be better understood, the following examples are given in addition to the examples already given above.

*Example 1*

To 345 ml. of a 1.1 N ethereal methyl chloramine solution (397 mmoles) is added with stirring at 25° C. 70 ml. to a 1.06 N hexane solution (74.5 mmoles) of 3,4-dichlorophenylisocyanate. After the solution is stirred for one hour, 50 ml. of water is added, and the mixture is stirred vigorously for several minutes. The aqueous phase is removed and the ethereal solution is washed three times with 50 ml. portions of water. The ethereal solution is dried over magnesium sulfate, filtered, and evaporated to dryness leaving 17.3 g. (91.5%) of 3-(3,4-dichlorophenyl)-1-methyl-1-chlorourea, M. 96.5–97.5° C. after several recrystallizations from hexane.

Example 2

After the manner of Example 1, the treatment of a 1 N hexane solution of 2,4-dichlorophenylisocyanate with a 1 N ethereal solution of methyl chloramine at 25° C. for one hour results in the formation of 3-(2,4-dichlorophenyl)-1-methyl-1-chlorourea.

Example 3

After the manner of Example 1, the treatment of a 1 N hexane solution of p-chlorophenylisocyanate with a 1 N ethereal solution of methyl chloramine at 25° C. for one hour results in the formation of 3-(p-chlorophenyl)-1-methyl-1-chlorourea.

Example 4

After the manner of Example 1, the treatment of a 1 N hexane solution of 3-chloro-4-isopropylphenylisocyanate with a 1 N ethereal solution of methyl chloramine at 25° C. for one hour results in the formation of 3-(3-chloro-4-isopropylphenyl)-1-methyl-1-chlorourea.

Example 5

After the manner of Example 1, the treatment of a 1 N hexane solution of 3,4-dichlorophenylisocyanate with a 1 N ethereal solution of methyl bromoamine results in the formation of 3-(3,4-dichlorophenyl)-1-methyl-1-bromourea.

Example 6

To a 1 N hexane solution of 3,4-dichlorophenyl-N-methyl carbamoyl chloride is added with stirring at 25° C. an ethereal solution which is 1 N both in methyl chloramine and trimethyl amine. The reaction mixture is stirred for two hours and the precipitated trimethyl amine hydrochloride is removed by filtration; the filtrate is evaporated to dryness leaving the 3-(3,4-dichlorophenyl)-1,3-dimethyl-1-chlorourea.

Example 7

After the manner of Example 6, the treatment of a 1 N hexane solution of p-chlorophenyl-N-methylcarbamoyl chloride with an ethereal solution which is 1 N each in methyl chloramine and trimethyl amine results in the formation of 3-(p-chlorophenyl)-1,3-dimethyl-1-chlorourea.

Example 8

After the manner of Example 6, the treatment of a 1 N hexane solution of 3-chloro-4-methylphenyl-N-methyl carbamoyl chloride with an ethereal solution which is 1 N both in methyl chloramine and trimethyl amine results in the formation of 3-(3-chloro-4-methylphenyl)-1,3-dimethyl-1-chlorourea.

Example 9

After the manner of Example 6, the treatment of a 1 N hexane solution of 3,4,5-trichlorophenyl-N-methylcarbamoyl chloride with an ethereal solution which is 1 N both in methyl chloramine and pyridine results in the formation of 3-(3,4,5-trichlorophenyl)-1,3-dimethyl-1-chlorourea.

Example 10

After the manner of Example 6, the treatment of a 1 N hexane solution of 3,4-dichlorophenyl-N-methylcarbamoyl chloride with an ethereal solution which is 1 N both in methyl bromoamine and trimethyl amine results in the formation of 3-(3,4-dichlorophenyl)-1,3-dimethyl-1-bromourea.

Example 11

Chlorine (0.25 mole) is added over 10 minutes at 17° C. to a stirring solution of 3-(3,4-dichlorophenyl)-1-methylurea (0.25 mole) and sodium acetate (0.25 mole) in glacial acetic acid (1200 ml.) in a 3 liter round-bottom flask. After the solution has stirred for ½ hour, it is poured into 6 liters of water. The oil which separates is crystallized by scratching, filtered, and air dried at 25° C. The dried product is boiled in cyclohexane for ½ hour and filtered hot. From the cooled filtrate 3-(3,4-dichlorophenyl)-1-methyl-1-chlorourea crystallizes. The compound remaining on the filter is 3-(2,3,4-trichlorophenyl)-1-methylurea, M. 229.0–229.5° C.

Example 12

After the manner of Example 11, the chlorination of 3-(3,4-dichlorophenyl)-1,3-dimethylurea results in the formation of 3-(3,4-dichlorophenyl)-1,3-dimethyl-1-chlorourea.

Example 13

After the manner of Example 11, the chlorination of 3-(2,4-dibromophenyl)-1-methylurea results in the formation of 3-(2,4-dibromophenyl)-1-methyl-1-chlorourea.

Example 14

After the manner of Example 11, the chlorination of 3-(3-chloro-4-isopropyl)-1-methylurea results in the formation of 3-(3-chloro-4-isopropyl)-1-methyl-1-chlorourea.

In the following examples, the percentage of each constituent part of the formulation is by weight.

Example 15

1-(3,4-DICHLOROPHENYL)-3-METHYL-3-CHLOROUREA

| | Percent |
|---|---|
| 1-(3,4-dichlorophenyl)-3-methyl-3-chlorourea | 30.0 |
| Alkyl naphthalene sulfonate, Na salt | 1.0 |
| Polymerized alkyl naphthalene sulfonate, Na salt | 1.0 |
| Kaolin clay | 68.0 |

The above components are mixed in a ribbon blender and then micropulverized until the urea is substantially all below 50 microns in particle size.

This formulation is applied at the rate of 2 pounds of active agent per acre in 40 gallons of water. Excellent pre-emergence control of crabgrass, lamb's-quarters, velvet leaf, foxtail, pigweed, chickweed, and barnyard grass is obtained. It is noted, following the period of effective pre-emergence weed control, that less residual chemical is present in acidic soils (low pH) as contrasted to alkaline soils (high pH).

Surfactants which are used in solid formulations, listed in this application, can be substituted in the above formulation to give percentage by weight as follows:

| 1-(3,4-Dichlorophenyl)-3-methyl-3-chlorourea | Surfactant | Inert Carrier | Total |
|---|---|---|---|
| 10 | 40 | 50 | 100 |
| 20 | 20 | 60 | 100 |
| 20 | 40 | 40 | 100 |
| 30 | 30 | 40 | 100 |
| 40 | 20 | 40 | 100 |

Example 16

1-(p-CHLOROPHENYL)-3-METHYL-3-CHLOROUREA

| | Percent |
|---|---|
| 1-(p-chlorophenyl)-3-methyl-3-chlorourea | 25.0 |
| Isophorone | 67.0 |
| Mixed polyoxyethylene ethers and oil soluble petroleum sulfonates | 8.0 |

The above emulsifiable concentrate is prepared by mixing the components to form a homogeneous liquid. It can be emulsified in water or diluted with an oil for direct oil spraying.

The above described formulation has utility for both contact and residual weed control. Twenty pounds of the active ingredient per acre applied in 85 gallons of Lion Herbicidal Oil No. 6 gives excellent control over goldenrod, lamb's-quarters, pigweed, ragged robin, wild snapdragon, foxtail, crabgrass, barnyard grass and quack grass.

*Example 17*

PREPARATION OF A TANK MIX

|  | Percent |
|---|---|
| 1-(p-chlorophenyl)-3-methyl-3-chlorourea | 50.0 |
| Dioctyl sodium sulfosuccinate solidified with 15% sodium benzoate | 1.0 |
| Low viscosity methyl cellulose | 0.25 |
| Diatomaceous silica | 48.75 |

The above mixture is blended and micropulverized to minus 325 mesh. Two pounds of the composition and two pounds of trimethyl nonyl ether with 6 moles ethylene oxide are added to 40 gallons of water in a spray tank.

This tank mix has outstanding utility for directed postemergence weed control in field corn, sweet corn and sugar cane. Forty gallons per acre of this spray mixture is applied to a vigorous growth of annual weeds about 2 to 6 inches high growing in corn which is 14 to 20 inches high. The spray pattern is directed to the weeds growing in the row and at the base of the corn plants. Control of crabgrass, barnyard grass, foxtail, annual morning glory, pigweed, lamb's-quarters and ragweed is obtained.

An increase in activity is noted by the addition of more surfactant. Under the wide variety of environmental factors influencing growth, it is found that the herbicidal content of the final spray can vary from 0.10 to 2.0% with 0.5 to 5 parts of surfactant for each part of the substituted urea.

The surfactants, liquid or solids, listed in this application can be substituted in the above tank spray mixture with satisfactory results. Thus such tank spray mixture can be made with the following proportions:

| 1-(p-chlorophenyl)-3-methyl-3-chlorourea | Conditioning Agents | Surfactant | Water | Total |
|---|---|---|---|---|
| 0.15 | 0.15 | 0.70 | 99.00 | 100 |
| 0.40 | 0.20 | 0.20 | 99.20 | 100 |
| 0.25 | 0.50 | 0.75 | 98.50 | 100 |
| 0.50 | 0.35 | 1.00 | 98.15 | 100 |
| 0.20 | 1.50 | 0.30 | 98.00 | 100 |
| 0.75 | 0.75 | 0.75 | 97.75 | 100 |
| 1.00 | 0.50 | 1.00 | 97.50 | 100 |
| 1.50 | 0.50 | 0.30 | 97.70 | 100 |

*Example 18*

PREPARATION OF GRANULES

The wettable powder of 1-(p-chlorophenyl)-3-methyl-3-chlorourea described in Example 17 is used to prepare a low strength granule as follows:

A slurry is prepared with the following composition:

|  | Percent |
|---|---|
| 50% active wettable powder | 15.57 |
| Swollen corn starch | 3.00 |
| Low viscosity polyvinyl alcohol | 5.00 |
| Water | 76.43 |

This slurry is then atomized with a sprayer on to tumbling U.S. Standard No. 15–30 mesh granular attaclay until the final composition is 37% slurry and 63% attaclay. The composition is then dried, to yield granules with the following composition:

|  | Percent |
|---|---|
| 1-(p-chlorophenyl)-1-methyl-1-chlorourea | 4.02 |
| Diluents, surfactants from wettable powders | 4.02 |
| Starch | 1.548 |
| Polyvinyl alcohol | 2.58 |
| Granular attaclay | 87.832 |

This granular formulation is applied at the rate of 100 pounds per acre for the pre-emergence control of annual weeds in asparagus rows. Weeds which are controlled include crabgrass, lamb's-quarters, pigweed, purslane and foxtail.

*Examples 19–54*

The following active compounds within the scope of this application are substituted for the active compound in Examples 1–18 giving substantially the same results.

Example:

19  3-(p-chlorophenyl)-1-methyl-1-bromourea
20  3-(3,4-dichlorophenyl)-1-methyl-1-bromourea
21  3-(2,4-dichlorophenyl)-1-methyl-1-chlorourea
22  3-(2,4-dichlorophenyl)-1-methyl-1-bromourea
23  3-(p-bromophenyl)-1-methyl-1-chlorourea
24  3-(p-bromophenyl)-1-methyl-1-bromourea
25  3-(p-tolyl)-1-methyl-1-bromourea
26  3-(3-chloro-4-methylphenyl)-1-methyl-1-chlorourea
27  3-(3-chloro-4-methylphenyl)-1-methyl-1-bromourea
28  3-(3-chloro-4-isopropylphenyl)-1-methyl-1-chlorourea
29  3-(3-chloro-4-isopropylphenyl)-1-methyl-1-bromourea
30  3-(p-chlorophenyl)-1,3-dimethyl-1-chlorourea
31  3-(p-chlorophenyl)-1,3-dimethyl-1-bromourea
32  3-(3,4-dichlorophenyl)-1,3-dimethyl-1-chlorourea
33  3-(3,4-dichlorophenyl)-1,3-dimethyl-1-bromourea
34  3-(2,4-dichlorophenyl)-1,3-dimethyl-1-chlorourea
35  3-(2,4-dichlorophenyl)-1,3-dimethyl-1-bromourea
36  3-(p-bromophenyl)-1,3-dimethyl-1-chlorourea
37  3-(p-bromophenyl)-1,3-dimethyl-1-bromourea
38  3-(p-tolyl)-1,3-dimethyl-1-chlorourea
39  3-(p-tolyl)-1,3-dimethyl-1-bromourea
40  3-(3-chloro-4-methylphenyl)-1,3-dimethyl-1-chlorourea
41  3-(3-chloro-4-isopropylphenyl)-1,3-dimethyl-1-bromourea
42  3-(3-chloro-4-isopropylphenyl)-1,3-dimethyl-1-chlorourea
43  3-(3-chloro-4-methylphenyl)-1,3-dimethyl-1-bromourea
44  3-(3,4-dichlorophenyl)-1-methyl-1-fluorourea
45  3-(3,4-dichlorophenyl)-1-methyl-1-chlorourea
46  3-(2,3,4-trichlorophenyl)-1-methyl-1-chlorourea
47  3-(3-methyl-4-chlorophenyl)-1-methyl-1-chlorourea
48  3-(3-chloro-4-isopropyl)-1-methyl-1-fluorourea
49  3-(3-chloro-4-isopropyl)-1-methyl-1-chlorourea
50  3-(3,4-dichlorophenyl)-1,3-dimethyl-1-chlorourea
51  3-(3-chloro-4-isopropylphenyl)-1,3-dimethyl-1-fluorourea
52  3-(3-chloro-4-isopropylphenyl)-1,3-dimethyl-1-chlorourea
53  3-(3,4-dichlorophenyl)-3-methoxy-1-methyl-1-chlorourea
54  3-(p-tolyl)-1-methyl-1-chlorourea The invention which I claim is:

1. A compound of the formula:

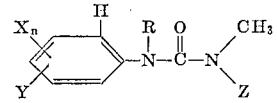

wherein

X is selected from the group consisting of hydrogen and halogen;

Y is selected from the group consisting of hydrogen, alkyl of 1 through and including 3 carbon atoms and halogen;

$n$ is selected from the group consisting of 1 and 2;

R is selected from the group consisting of hydrogen, methyl and methoxy; and

Z is selected from the group consisting of fluorine, chlorine and bromine.

2. 1-(p-chlorophenyl)-3-methyl-3-chlorourea.
3. 1-(3,4-dichlorophenyl)-3-methyl-3-chlorourea.

References Cited in the file of this patent

UNITED STATES PATENTS

| | | |
|---|---|---|
| 2,663,729 | Searle et al. | Dec. 22, 1953 |
| 2,663,730 | Hill et al. | Dec. 22, 1953 |
| 2,704,245 | Searle et al. | Mar. 15, 1955 |
| 2,705,195 | Cuprey et al. | Mar. 29, 1955 |

OTHER REFERENCES

Chattaway et al.: J. Chem. Soc., London, volume 97 (1910), pages 292–9.